(12) United States Patent
Turner et al.

(10) Patent No.: US 7,420,768 B2
(45) Date of Patent: Sep. 2, 2008

(54) CARTRIDGE LOADING APPARATUS

(75) Inventors: Philip Turner, Bristol (GB); Mark Dillon, Bristol (GB); Andrew Mark Fernihough, Bath (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 348 days.

(21) Appl. No.: 11/251,510

(22) Filed: Oct. 14, 2005

(65) Prior Publication Data
US 2006/0092555 A1 May 4, 2006

(30) Foreign Application Priority Data
Oct. 28, 2004 (GB) ................................. 0424014.9

(51) Int. Cl.
*G11B 15/675* (2006.01)
*G11B 5/008* (2006.01)

(52) U.S. Cl. ...................... 360/96.51; 360/94
(58) Field of Classification Search .................. 360/94, 360/96.5, 96.6, 96.51, 96.61
See application file for complete search history.

(56) References Cited

U.S. PATENT DOCUMENTS

| | | | | |
|---|---|---|---|---|
| 5,124,854 A | * | 6/1992 | Iyota et al. .................. 360/96.6 |
| 5,450,259 A | * | 9/1995 | Cho et al. ................... 360/96.6 |
| 5,558,291 A | * | 9/1996 | Anderson et al. ............ 242/336 |
| 5,793,565 A | * | 8/1998 | Suzuki ......................... 360/94 |
| 5,822,149 A | * | 10/1998 | Takase et al. .................. 360/94 |
| 5,923,497 A | * | 7/1999 | Suzuki ....................... 360/96.5 |
| 2007/0091502 A1 | * | 4/2007 | Murase et al. ................. 360/85 |

FOREIGN PATENT DOCUMENTS

| | | |
|---|---|---|
| EP | 0 415 411 A2 | 8/1990 |
| EP | 0 807 933 A1 | 11/1997 |

\* cited by examiner

*Primary Examiner*—William J Klimowicz

(57) ABSTRACT

A cartridge loading apparatus 300 comprises a cartridge loading device 10 for magnetic tape cartridges and a mounting 302 for the device. The cartridge loading device comprises a first member 12, a second member 14 and a guide arrangement for guiding movement of the second member relative to the first member from a first position to a second position. The first and second members cooperating when in the first position to define a first sized opening having a height sized to receive first sized magnetic tape cartridges having a height that is greater than the height of the first sized opening. The cartridge loading device has a front end at which cartridges are inserted into the opening, a rear end and opposite sides extending between the front and rear ends. The mounting supports the cartridge loading device at each side such that the cartridge loading device can slide rearwardly in the mounting from a forward position and such that when in its forward position, the cartridge loading device can pivot about an axis disposed at its rear end and extending between the sides.

17 Claims, 4 Drawing Sheets

CARTRIDGE LOADING APPARATUS

FIELD OF THE INVENTION

The invention relates to cartridge loading apparatus for magnetic tape cartridges used for storage of digital data.

BACKGROUND TO THE INVENTION

Magnetic tape is commonly used for storage of digital data. The magnetic tape is spooled on reels in a cartridge that is insertable into a digital data transfer apparatus in which data can be written onto the tape and/or data can be read from the tape. Such data transfer apparatus, which may be referred to as a tape drives, typically includes a tape head for one or both of reading and/or writing data from or to the tape head.

Known tape drives are generally designed to use a predetermined size tape cartridge that contains tape having a known width. Known cartridge loading devices of tape drives are generally designed to be used with a particular size of cartridge. Such devices conventionally include means for ensuring that only cartridges of the correct size can be inserted and then only when the cartridge is correctly oriented. A feature of known cartridge loading devices is that they are made rigid so that cartridges of the wrong size or incorrectly oriented cartridges cannot be forced into the tape drive, except by the exertion of an unnatural amount of force.

One format for data storage in a helical scan tape drive is Digital Data Storage (DDS). Various versions of DDS exist, but each version uses the same width tape in Digital Audio (DAT) cartridges, including DAT72 and DAT160. The tape width is approximately 4 mm. There is a demand for more and more data storage capacity. This has, to some extent, been met by improved reading and writing techniques that have allowed increased amounts of data to be stored, without changing the tape length or width. However, ultimately, the storage capacity of a given size of tape has a limit.

One solution to the problem of data storage capacity is to increase the width of the tape. Of course, a greater width provides more storage capacity. However, since the cartridge loading devices of tape drives are designed to accept a particular size cartridge, if wider tapes are used, tape drives with loading devices able to accept a larger cartridge must be provided. This then provides the user with the problem that legacy format tape cartridges would not be usable with the new tape drive and so it would be necessary to maintain more than one tape drive or transfer existing stored data to the wider tape.

Conventional cartridge loading devices that can only accept a single size of cartridge are designed in such a way that cartridges can only be inserted when correctly oriented. To this end, conventional cartridge loading devices are of rigid construction and equipped with means, such as ramps or ribs, that interact with formations on the cartridge to prevent insertion in any but the correct orientation. The result is that an incorrectly oriented cartridge can only be inserted by using an unnaturally large force, usually such as would result in damage to the device and/or cartridge.

The applicant is proposing a new cartridge loading device that can expand in such a way that it can accept different sized cartridges. By this means, a single device can be used with tapes having different widths. In such a cartridge loading device, it remains desirable to have means for preventing the insertion of incorrectly oriented cartridges. However, the conventional means rely on the rigidity of the cartridge loading device.

FIG. 1 shows the underside of a conventional DAT cartridge 1. The cartridge 1 is generally rectangular and comprises a two-piece body 2, a slider 3 mounted on the lower half of the body and a lid 4 hinged to the front side of the upper half of the body. The slider 3 has two grooves 5 formed in its side that faces away from the body 2. Each groove has two apertures 6, 7 formed in its base. There the apertures 6 are at the front end of the respective grooves and the apertures 7 are at the rear end. The lower half of the body 2 is provided with two detents 8, one for each groove 5. In the position of the slider 3 illustrated in FIG. 1, the detents 8 are engaged in the rear end apertures 7. The cartridge contains a supply hub and a take up hub (not shown) around which the tape is spooled and the lower half of the body 2 has respective spindle apertures (not shown) to permit spindles of a spindle drive to engage the hubs. The slider 3 also defines two apertures 9 and can be slid to a position in which the apertures overlie the spindle apertures to permit access to the hubs.

In order to access the tape contained within the cartridge, it is necessary for the slider 3 to be slid away from the front side of the cartridge 1 toward the rear. This brings the apertures 9 into line with the spindle apertures so that the spindle drive can be raised to engage with the hubs. Rearward movement of the slider 3 also provides access to the lid 4 which is pivotted clockwise (as viewed in the drawing) to allow the tape to be drawn forward from the cartridge to bring it into contact with the tape head.

In order to cause the slider 3 to slide to the rear of cartridge body 2, tape drives are conventionally provided with small ribs (for example, see the ribs 57 on the floor 56 of the cartridge loading device 10 shown in FIG. 2). As the cartridge is slid into the cartridge loading device, the ribs 57 enter the respective grooves 5 at their front ends. As the cartridge 1 is inserted further into the cartridge loading device, the grooves 5 slide over the ribs 57 until the ribs engage and press the detents 8 down and out of the rear end apertures 7. This releases the slider 3 and continued insertion of the cartridge results in the slider being pushed rearwardly on the body 2. When the cartridge is fully inserted, the ribs are clear of the front end of the grooves allowing the detents 8 to penetrate the front end apertures 6 and so lock the slider in place. Once the slider is pushed back, the lid can be raised and the tape drawn forwardly from the cartridge by a tape guide assembly (not shown). When the cartridge is withdrawn from the cartridge loading device, the ribs 57 push the detents 8 out of the front end apertures 6 allowing the slider 3 to be slid toward the front side of the cartridge by a spring until the detents 8 engage in the rear end apertures 7.

It is important that the ribs 57 should properly engage in the grooves 5 and move the slider 3 to its rearward position. Without this, the lid 4 cannot open and the spindle drive will punch a hole through the underside of the cartridge, rather than passing through the apertures 9 and into engagement with the hubs.

The grooves 5 and ribs 57 are relatively small features. The grooves have a standard width of around 3 mm and a depth of 0.65 mm±0.05 mm. Therefore, in order for the ribs 57 to function, the tolerances in production of the cartridge loading device 10 and the cartridge must be kept tight. For example, if the height of the opening in the cartridge loading device 10 into which the cartridge is inserted is just a little too large, the cartridge could simply "float" over the ribs 57, which would then not penetrate sufficiently deeply to release the detents and slide the slider to the rear of the cartridge.

In conventional cartridge loading devices having a one size opening, the construction is rigid and it is possible to manufacture to tolerances that should ensure the ribs 57 function every time a cartridge is inserted into the cartridge loading device. In an expandable cartridge loading device as proposed by the applicant, this is more problematical, since there will be parts that move relative to each other in order to provide the expansion and this makes it more difficult to manufacture to tight tolerances.

Yet another problem is that the apparatus in which the cartridge loading device is housed must have an inlet aperture that is sufficiently large to allow the insertion of the different sizes of cartridge to be used. The inlet apertures of conventional apparatus can be sized to control the orientation of the cartridge when it is inserted into the cartridge loading device. That is, the inlet aperture can be sufficiently close to the size of the cartridges it is designed to receive as to ensure that when cartridges are inserted into the cartridge loading device, they are not inclined or twisted with respect to the XYZ axes of the device. This is not possible with an inlet aperture that must allow the insertion of two sizes of cartridge. The inlet aperture can be used to provide control of the orientation of the larger of the two sizes of cartridge in the conventional way. However, it cannot control the orientation of the smaller size of cartridge. Thus, as illustrated by the arrow 200 in FIGS. 7, 9 and 10, the smaller size of cartridge can be inserted into the cartridge loading device while inclined downwardly with respect to the cartridge loading device. This makes it possible for the smaller size cartridge to be inserted into the cartridge loading device in such a way that the grooves 5 ride over the ribs 57 and so the detents 8 are not released and the slider 3 does not slide back.

SUMMARY OF THE INVENTION

The invention provides cartridge loading apparatus comprising a cartridge loading device for magnetic tape cartridges and a mounting for said device, said cartridge loading device comprising a first member, a second member and a guide arrangement for guiding movement of said second member relative to said first member from a first position to a second position, said first and second members cooperating when in said first position to define a first sized opening having a height sized to receive first sized magnetic tape cartridges having a predetermined height and, when in said second position, to define a second sized opening having a height that is greater than the height of said first sized opening, said second sized opening being sized to receive second sized magnetic tape cartridges having a predetermined height that is greater than the height of said first sized magnetic tape cartridges, said cartridge loading device having a front end at which cartridges are inserted into said opening, a rear end and opposite sides extending between said front and rear ends, and said mounting supporting said cartridge loading device at each said side such that said cartridge loading device can slide rearwardly in said mounting from a forward position to a rearward position and said front end of the cartridge loading device can pivot about an axis disposed towards said rear end and extending between said sides during a first portion of said rearward movement.

The invention provides cartridge loading apparatus comprising a cartridge loading device for magnetic tapes and support means for said cartridge loading device, said cartridge loading device comprising housing means defining a housing for magnetic tape cartridges and first guide means and said support means comprising second guide means engageable with said first guide means, said housing having a front end into which cartridges are inserted, a rear end and sides extending between said front and rear ends and being expandable from a first size to a second size, said first size having a first height and said second size having a second height, said second height being greater than said first height, said sizes being selected such that said housing can receive magnetic tape cartridges of different predetermined sizes for loading into a digital data transfer apparatus, said support means having a front end and a rear end and said first and second guide means cooperating to permit rearward movement of said cartridge loading device from a forward position to a rearward position and to permit said front end of the cartridge loading device to pivot in a first direction about an axis extending between its sides during a first portion of said rearward movement.

The invention provides cartridge loading apparatus comprising a cartridge loading device for magnetic tape cartridges and support means for said cartridge loading device, said cartridge loading device defining a housing for magnetic tape cartridges, said housing having a front end into which cartridges are inserted and a first guide means and said support comprising a second guide means cooperable with said first guide means, said first and second guide means cooperating to permit pivoting movement of said housing about an axis extending parallel to said front end.

BRIEF DESCRIPTION OF THE DRAWINGS

In order that the invention may be well understood, an embodiment thereof, which is given by way of example only, will now be described with reference to the drawings, in which.

DETAILED DESCRIPTION

Figure 1:
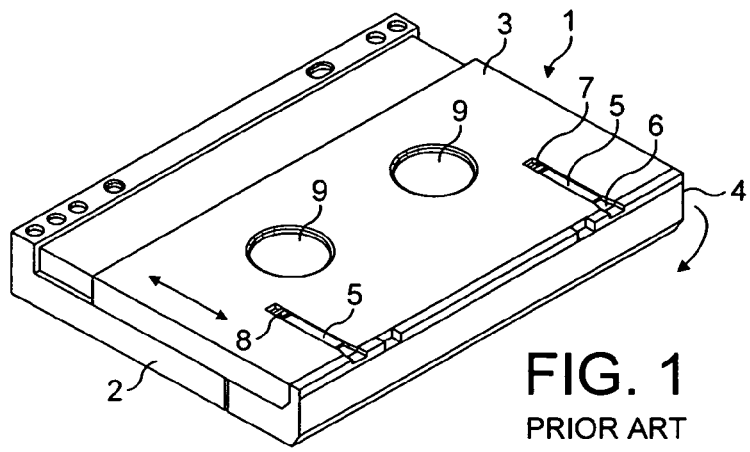
FIG. 1 is a perspective view of the underside of a conventional DAT cartridge.
Figure 2:
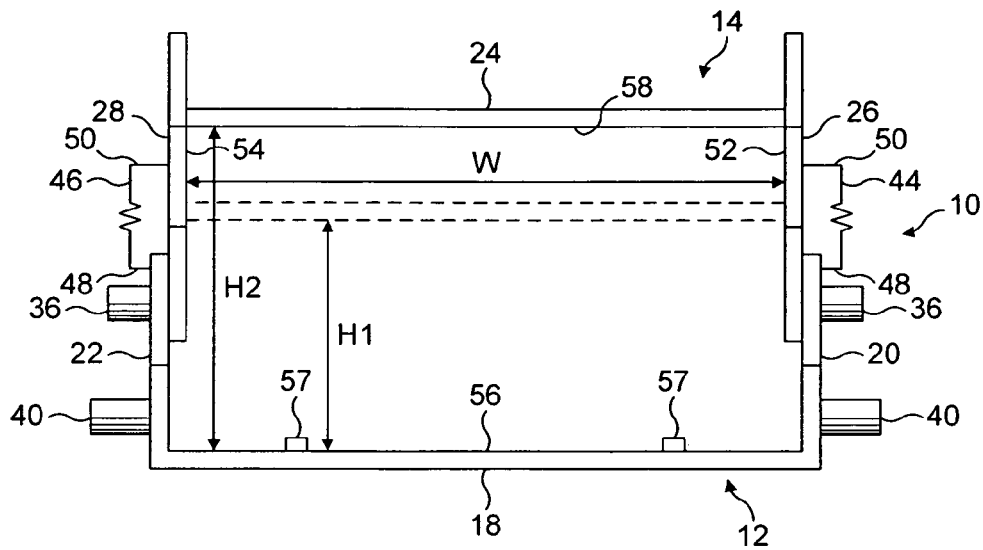
FIG. 2 is a is a front elevation of a cartridge loading device in one condition.

Referring to FIG. 2, a cartridge loading device 10 for magnetic tape cartridges used for storage of digital data comprises a first member 12 and a second member 14. Each member 12, 14 comprises a generally U-shaped channel and the two channels are oppositely disposed so as to define a housing for magnetic tape cartridges that has a substantially rectangular opening 16. As described in more detail below with reference to FIGS. 9 and 10, the cartridge loading device 10 is a part of cartridge loading apparatus 300 comprising the device 10 and a mounting 302.

The U-shaped channel of the first member 12 comprises a horizontally disposed base or floor portion 18 and opposed upstanding limbs 20, 22 that extend perpendicular to the base portion 18. The U-shaped channel of the second member 14 comprises a horizontally disposed upper or roof portion 24 and opposed depending limbs 26, 28 that extend perpendicular to the roof portion and parallel to the limbs 20, 22 of the first member 12. The arrangement is such that the limbs 26, 28 of the second member are disposed inside of, and adjacent and parallel to, the respective limbs 20, 22 of the first member 12.

The limbs 20, 22 of the first member 12 are each provided with guide tracks in the form of two elongate slots 30, 32 that are upwardly inclined towards the rear 34 of the cartridge loading device 10. The limbs 26, 28 of the second member 14 are each provided with outwardly projecting pins 36, 38 that project through the respective slots 30, 32 and can slide back and forth in the slots that define respective straight movement lines along the axes of the slots. The slots 30, 32 and pins 36, 38 constitute a guide arrangement that guides movement of the second member 14 relative to the first member 12.

The limbs 20, 22 of the first member 12 are fitted with a set of outwardly projecting pins 40, 42 by which the cartridge loading device 10 is located in a digital data transfer apparatus, or tape drive (not shown).

Figure 3:
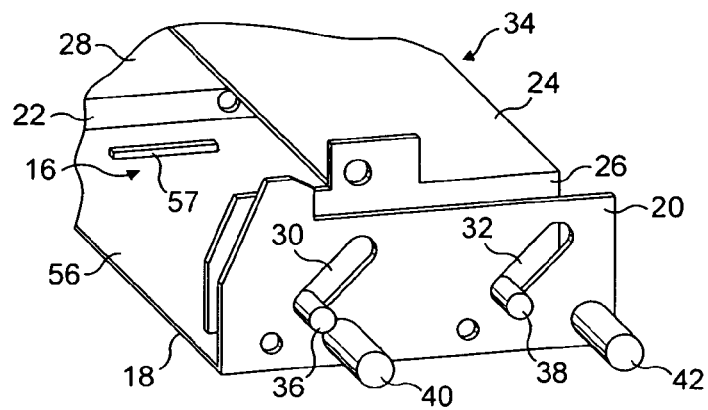
FIG. 3 is a perspective view of the cartridge loading device of FIG. 2 in another condition.

The first and second members 12, 14 are held together in the condition shown in FIG. 3 by a spring biassing arrangement. By way of example, tension springs 44, 46 are shown connected at their ends to respective pins 48, 50 provided on the limbs of the first and second members 12, 14. It is to be understood that the arrangement of springs and pins shown in FIG. 2 is purely schematic. The springs and pins have been omitted from FIGS. 3 and 4 for the sake of clarity. As another alternative, springs might be attached to one or more of the pins 36, 38 and respective attachment portions, such as lugs, on the first member 12. It is also to be understood that other forms of spring biassing can be used and that the biassing of the two members 12, 14 can be achieved by means other than springs.

The normal condition of the cartridge loading device is as shown in FIG. 3. In this condition, the second member 14 is pulled down towards the first member 12 so that the pins 36, 38 are at the lower ends of the respective slots 30, 32. In this condition, and referring to FIG. 2, the opening 16 has a size determined by the distance W between the inner surfaces 52, 54 of the limbs 26, 28 of the second member 14 and the distance H1 between the inner surface 56 of the floor 18 and the inner surface 58 of the roof 24, which for the FIG. 3 condition is shown by dashed lines in FIG. 2. The first sized opening 16 thus described is a relatively narrow opening for cartridges containing a relatively narrow width tape. Typically, the first sized opening might be for a 4 mm tape cartridge.

Figure 4:
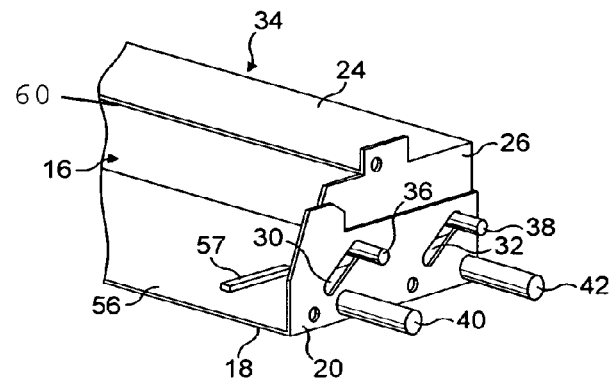
FIG. 4 is a perspective view of the cartridge loading device in the same condition as in FIG. 2.

By virtue of the permitted movement of the second member 14 relative to the first member 12, the size of the opening 16 can be increased to accept a larger cartridge. Typically, the larger cartridge might be an 8 mm tape cartridge. When a larger cartridge is inserted into the opening 16 with the cartridge loading device 10 in the condition shown in FIG. 2, the force applied to the second member 14 pushes the second member upwardly and towards the rear 34 of the device. The movement of the second member relative to the first member is guided by the pins 36, 38 sliding in the slots 30, 32. The guide arrangement is configured such that with the pins 36, 38 at the upper ends of the slots 30, 32 (as shown in FIG. 4), the size of the opening 16 is increased to a second size, just large enough to receive the larger size cartridge. The second size opening has a width W equal to that of the first size opening. However, the height of the opening is increased to H2. The second size opening is thus able to accommodate a larger size cartridge, such as an 8 mm tape cartridge, having a relatively wider tape than the cartridge that can be received in the first size opening.

In the illustrated embodiment, the slots 30, 32 are inclined at an angle of 45° to the horizontal, i.e. to the floor 18. It will be appreciated that the angle of inclination can be varied. However, 45° is preferred, since if the angle is steeper, the force required to move the second member from the position shown in FIG. 3 to the position shown in FIG. 4 is increased, while if the angle of inclination is made less steep, the movement of the second member is made too long.

When a larger size cartridge is removed from the opening 16 of the cartridge loading device 10, the springs 44, 46 pull the second member 14 down towards the floor 18 of the first member. The springs are selected to have sufficient spring force to reliably return the device to the FIG. 3 condition. It will be appreciated that the springs should not be overly stiff, as this would increase the force required to move the second member 14 away from the first member 12 to permit insertion of the larger size cartridge and produce an unnecessarily harsh closing action.

The first and second members 12, 14 are preferably made from a metal, such as steel. Steel components are preferably treated to prevent corrosion.

In order to facilitate the upward movement of the second member 14 relative to the first member 12, it may be desirable to provide an inclined, or ramp-like, lead-in to the opening 16. By way of an example, the leading edge 60 (FIG. 4) of the roof 24 of the second member could be provided with a plastics member, or members, that provide an inclined lead-in to the opening 16. The plastics member(s) might, for example, comprise a body comprising a groove for fitting to the leading edge 60 (preferably the groove would be sized to be a push-fit) with a ramp-like front surface opposite to the side provided with the groove. The inclination of the ramp-like surface would be down towards the floor 18 of the first member and towards the rear of the cartridge loading device 10.

It will be understood that although the embodiment has two members 12, 14 arranged such that the upper of the two moves upwardly with respect to the lower, it is equally possible to have an arrangement in which the lower member moves downwardly with respect to the upper member.

The cartridge locking device is provided with a locking system to assist in preventing the insertion of cartridges that are not correctly oriented by controlling relative movement between the first member 12 and the second member 14. The locking system will now be described with reference to FIGS. 5 to 8.

Figure 5:
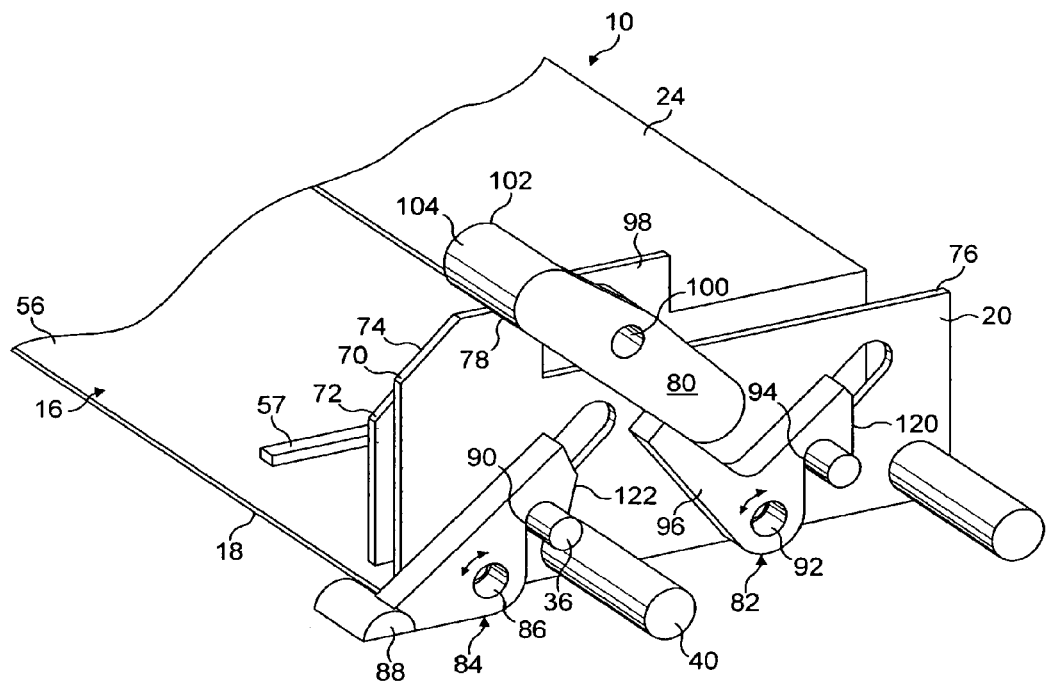
FIG. 5 is a perspective view, corresponding generally to FIG. 3, showing an locking system for the cartridge loading device.

Referring to FIG. 5, the limb 20 of the first member 12 has a bevelled leading edge 70. The limb 26 of the second member 14 has a similar bevel 72. The limbs 22 and 28 have corresponding bevels (not shown). The limb 20 additionally includes a projection, or ear, 74 projecting upwardly of the upper edge 76 of the limb. The rearward side of the ear 74 defines an inclined stop surface 78 that acts as a stop for an actuating member 80, which is a part of the locking system. The locking system additionally comprises a first locking member 82 and a second locking member 84.

The first locking member 82 is pivotally mounted on the limb 20 of the first member 12 at pivot point 92. The first locking member 82 comprises a plate that defines a recess, or notch, 94 that is shaped and positioned to engage the pin 38.

The configuration of the first locking member is such that it is biassed by gravity to positions in which the recess 94 can engage the pin 38. The first locking member 82 includes an arm 96 that projects upwardly towards the front of the cartridge loading device 10. A rear end portion of the actuating member 80 rests on the free end of the arm 96.

The second locking member 84 is pivotally mounted on the limb 20 at pivot point 86. The second locking member 84 consists of a plate-like portion and a cartridge-engaging portion 88 provided at one end of the plate-like portion. The plate-like portion defines a notch, or recess, 90 that is shaped and positioned to engage the pin 36. The cartridge-engaging portion 88 projects at 90° to the plane of the plate-like portion and beyond the limbs 20, 26 so that it lies in the path of any cartridge that is in the process of being inserted into the opening 16. The configuration of the second locking member 84 is such that it is biassed by gravity to rotate to positions in which the recess 90 can engage the pin 36 and the cartridge-engaging portion 88 is in front of and at least partially above the level of the inner surface 56 of the floor 18 of the first member 12.

The pivot points 86, 92 of the first and second locking members 82 and 84 are located in line with the respective lines of movement defined by the slots 30, 32 associated with the locking members.

The actuating arm 80 is pivotally mounted on an ear 98 that projects upwardly of and is integral with the second member 14. The pivot mounting is intermediate the ends of the actuating member 80 at 100. The actuating member 80 comprises a generally planar portion and a projection 102 at its leading end. The projection 102 extends perpendicular to the plane of the actuating member 80 and inwardly of the ear 98 so that it is disposed above the opening 16. The front surface 104 of the projection is a curved cartridge-engaging surface. The actuating member 80 is configured such that it is biassed by gravity to rotate anticlockwise from the position shown in FIG. 5 and is prevented from rotating anticlockwise by the stop surface 78.

Preferably, the limbs 22, 28 on the opposite side of the device 10 are provided with a corresponding, or similar, locking system (not shown).

The operation of the locking system will now be described with particular reference to FIGS. 6 to 8.

Figure 6:
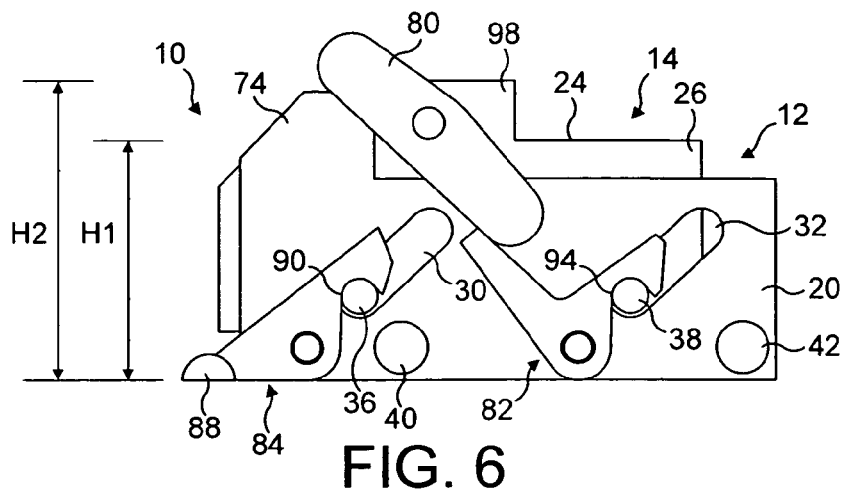
FIG. 6 is a side elevation view of the cartridge loading device as shown in FIG. 5.
Figure 7:
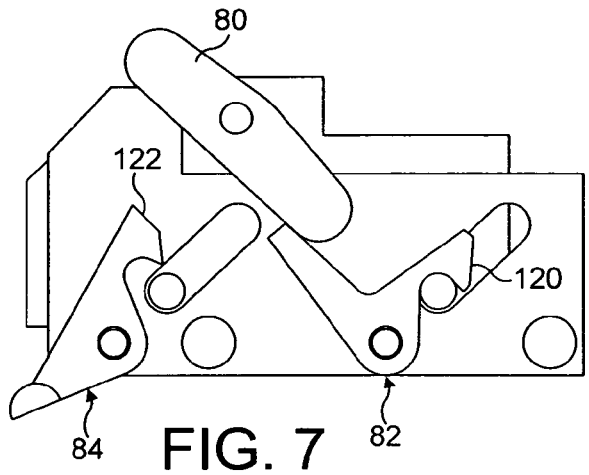
FIG. 7 is a view corresponding to FIG. 6 showing the condition of the locking system after the insertion of a first-sized cartridge (not shown)

FIG. 6 shows the cartridge loading device 10 in the condition in which it is shown in FIG. 5. As shown in FIG. 8, the device 10 is located in a housing, or compartment, having a roof member 110. The housing has an upper door 112 and a lower door 114. A cartridge must be inserted through the doors 112, 114 in order to access the cartridge loading device. As viewed in FIG. 6, the upper door 112 pivots anticlockwise from a closed position to an open position and the lower door 114 pivots clockwise to its open position. The open position of the upper door 112 is defined by a stop 116 that is supported by the roof member 110. Typically the doors 112, 114 are biassed to their respective closed positions by a biassing arrangement (not shown). The biassing arrangement could comprise respective spring members wound around the pivot shafting on which the doors are mounted. However, any suitable known biassing arrangement can be used.

In the condition shown in FIG. 6, the pin 38 is engaged in the recess 94 of the first locking member 82 and the pin 36 is engaged in the recess 90 of the second locking member 84, while the actuating member 80 rests on both the stop surface 78 and the arm 96 of the first locking member 82. In this condition, the pins 36 38 are held at the bottom of the respective slots 30, 32 in such a way that there can be no relative movement between the first and second members 12, 14. In this locked condition, the opening 16 of the cartridge loading device 10 has its first size, with a width W and height H1. A cartridge that is the correct size for the first sized opening and is correctly oriented can be slid past the doors 112, 114 into the opening 16 of the cartridge loading device 10.

As described above, cartridge loading devices are provided with features that interact with the cartridges they are intended to receive to ensure that the cartridges can only be inserted into the device when correctly oriented. At least in part, such features rely on the rigidity of the cartridge loading device in order to function. For example, ramps may be provided adjacent the opening of the cartridge loading device. If the cartridge is inserted in anything except the correct orientation, the ramps drive the cartridge upwardly or downwardly with respect to the opening and due to the rigidity of the cartridge loading device, the cartridge cannot be forced into the opening. If the cartridge is correctly oriented, the ramps do not act on the cartridge, which can, therefore, slide easily into the opening.

The locking system enables the cartridge loading device 10 to be provided with such features for ensuring the correct orientation of cartridges inserted into the opening 16. FIG. 7 shows how the locking system reacts to the insertion of a cartridge that is the correct size for the first-sized opening having a height H1. As the cartridge enters the opening, its underside (or upperside if the cartridge is inserted the wrong way up) pushes the projection 88 of the second locking member 84 downwards causing the locking member 84 to rotate anticlockwise and releasing the pin 36 from its captive state in the recess 90. However, the pin 38 remains firmly engaged in the recess 94 of the first locking member 84 and so cannot slide in its slot 32. As a result, the position of the second member 14 relative to the first member remains fixed. If the cartridge is inserted in the wrong orientation, the ramps will force the cartridge upwards/downwards and because the first locking member 82 remains engaged with the pin 38, the opening 16 will not change size and so the cartridge will not be able to enter the cartridge loading device.

Figure 8:
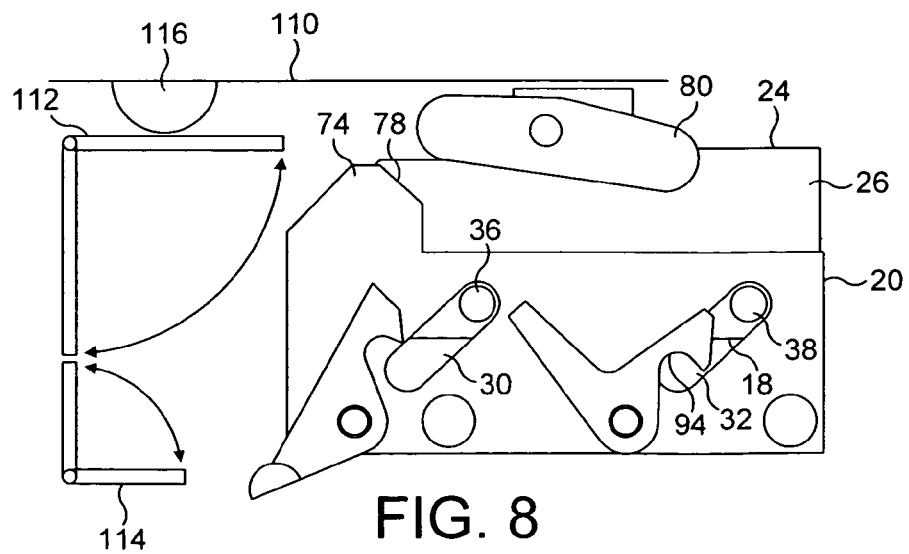
FIG. 8 is a side elevation view of the cartridge loading device showing the condition of the locking system after insertion of a second-sized cartridge (not shown)

FIG. 8 illustrates how the locking system reacts to the insertion of a cartridge that fits into the second sized opening having the height H2. As the cartridge is inserted into the opening 16, it pushes down on the projection 88 of the second locking member 84 causing it to rotate anticlockwise and release the pin 36 from the recess 90. The pin 36 is, thus, free to slide in the slot 30.

Continued insertion of the cartridge results in contact with the curved surface 104 of the projection 102 of the actuating member 80. As the cartridge moves forward, it pushes against the projection 102 causing it to rotate clockwise about its pivot position 100. As the actuating member 80 rotates, it presses down on the arm 96 of the first locking member 82. The downward force acting on the first locking member causes it to rotate anticlockwise and so release the pin 38 from the recess 96. At this stage, both pins 36, 38 are free to slide in their respective slots 30, 32 and the second member 14 is free to move relative to the first member, as described in connection with FIGS. 2 to 4.

Continued insertion of the cartridge forces the second member 14 upwards relative to the first member 12, thus expanding the size of the opening 16 to its maximum height H2, at which the cartridge can be fully inserted into the cartridge loading device 10. Of course, if the cartridge is inserted incorrectly oriented, the features mentioned above will take effect and the cartridge will be forced upwardly or downwardly with respect to the opening 16. Since the maximum height H2 of the opening only just permits insertion of the cartridge and further expansion is prevented by engagement of the pins 36, 38 in the upper ends of the respective slots 30, 32, the incorrectly-oriented cartridge cannot be inserted into the cartridge loading device.

As the second member 14 moves upwardly relative to the first member 12, the projection 102 of the actuating member 80 comes off the top of the cartridge. The gravity bias of the actuating member 80 causes it to rotate anticlockwise. The anticlockwise rotation brings the actuating member 80 back through the position shown in FIG. 6 to an orientation in which the leading end of the actuating member is not as high, relative to its rear end, as when in the FIG. 6 position. The result is that the vertical distance by which the actuating member 80 projects above the second member 14 is reduced to the extent that the ear 98 projects vertically beyond it. This can be seen by comparing the orientation of the actuating member 80 and its position relative to the ear 98 in FIGS. 6 and 8. This provides an important advantage, in that it allows the actuating member to fit under the roof member 110 despite the relative elevation that is a consequence of the upward movement of the second member 14. This is important, because it allows the cartridge loading device 10 to be used in the same size of housing, or compartment as a conventional non-expanding device.

Although not shown in FIG. 8, once the cartridge is fully inserted, the second locking member 84 is able to rotate under the influence of gravity back to the position shown in FIG. 6. Similarly, as the second member 14 moves upwardly to the position shown in FIG. 8, the rear end of the actuating member 80 loses contact with the arm 96 of the first locking member 82, which then rotates under the influence of gravity to the FIG. 6 position.

When a relatively larger cartridge is removed from the cartridge loading device 10, the second member 14, the springs 44, 46 (FIG. 2) pull the second member 14 from the position shown in FIG. 8 to the position shown in FIG. 6. The first and second locking members 82, 84 have respective cam faces 120, 122 that are configured such that as the pins 36, 38 move back down the slots 30, 32, they engage the cam faces and cause the locking members to rotate anticlockwise to permit the pins to return to the lowermost ends of the slots. Once the pins 36, 38 have reached the ends of the slots, the locking members 82, 84 rotate clockwise under the influence of gravity in order to bring the pins 36, 38 into engagement with the respective recesses 90, 94, thereby returning the cartridge loading device to the condition shown in FIG. 6.

It will be appreciated that the locking system allows for the provision of an expandable cartridge loading device that can expand from a first size to a second size and still retain the necessary rigidity to permit the functioning of features that prevent the insertion of incorrectly oriented cartridges. The arrangement of the actuating member 80 and locking member 82, 84 is such that the first and second locking members are progressively released by insertion of a correctly oriented and second sized cartridge into the opening 16. Similarly, the members of the locking system are returned to their locking positions simply by the influence of gravity when the cartridge is removed. Thus, the locking system is actuated by normal insertion and removal of a correctly sized cartridge without the provision of a drive device, which allows the possibility of greater reliability and economic manufacture.

In the embodiment, the locking members 82, 84 are biassed by gravity alone to the positions in which they engage the pins 36, 38. That is, the configuration of the locking members 82, 84 and their respective pivot positions 86, 92 is such that without some other external influence, the locking members will tend to rotate to the positions shown in FIG. 5. Similarly, the actuating member 80 is configured and pivotted so that gravity will cause it to rotate to the FIG. 8 position. However, it will be understood that this is not essential. Some, or all, of these parts may be urged to those positions by other means, such as a spring biassing arrangement.

As previously indicated, it is preferred that both sides of the cartridge loading device 10 are provided with a locking system such as is shown in FIGS. 5 to 8. However, it is envisaged that a locking system on just one side may be sufficient.

The locking system as shown has a first and second, or front and rear, locking member and, although that is the presently preferred arrangement, it is envisaged that the front locking member 84 could be dispensed with.

In the embodiments, the projections 88 and 102 are integral parts of the second locking member 82 and the actuating member 80 respectively. This is not essential. One, or both, projections could take the form of rollers mounted on an axle projecting from the respective member.

As shown, the stop surface 78 for the actuating member 80 is defined by a portion of the limb 20. Although this arrangement is to be preferred for simplicity, the stop surface could, instead, be defined by a separate part fixed to the first member 12 or a housing in which the cartridge loading device is housed.

A further factor affecting the design of cartridge loading devices, and in particular the applicant's proposed expanding cartridge loading device, is the so-called form factor. The form factor determines the size of box, or housing, the tape drive can be housed in if it is to be received in the standard sized compartments and openings to be found in computer equipment and the like. If a cartridge loading device that is expandable to receive larger size cartridges is to be widely used, it must be made such that it can fit into the same size compartments and openings as conventional single size cartridge loading devices.

In the embodiment, when the second member 14 has moved to its second position, the actuating member 80 moves to a position in which it is entirely below the uppermost extent of the second member 14, which is the top edge of the ear 98. While this arrangement is preferred, it is not essential. Advantage can be obtained if the actuating member moves, or is moved, to a position in which the vertical distance it projects beyond the second member is reduced as compared with the vertical distance it projects beyond the second member when it is resting on the stop surface 78 and/or acting on the first locking member 82. It will also be appreciated that it is the vertical projection distance that is important in order to obtain the advantage. This does not preclude the possibility of the actuating member projecting beyond the first and/or second members 12, 14 in the horizontal direction, should this be desirable.

In referring to the height H1, H2 of the first and second sized openings, it is to be understood that this does not have to be uniform across the width of the opening. The height is the distance between a portion of the first member and an opposed portion of the second member that controls whether a cartridge which the opening is intended to receive can actually be received. The height might be the spacing between two plane surfaces as shown in FIG. 2. However, as an example of an alternative arrangement, the roof portion 24 might be provided with one or more projections facing the floor portion 18 and it would be the distance between the projection, or projections, and the floor portion that would represent the height and determine the height of cartridge that could be received in the opening.

As an alternative to the ramps described above, it will be understood that the first member 12 and second member 14 can be provided with ribs or grooves configured to mate with ribs or grooves on a cartridge that are arranged to ensure that the cartridge is inserted in the correct orientation. For example, a rib, or projection, might be provided on the floor portion 18 to one side of the centreline of the opening 18. This would be positioned such that provided the cartridges the opening is intended to receive are correctly oriented when inserted into the opening, the rib will be received in a groove, or recess, in the cartridge. As is known, such an arrangement can ensure that cartridges can only be inserted into the opening when correctly oriented. As with the system of ramps described above, it will be appreciated that when a cartridge that is the correct size for the first size opening is inserted into the cartridge loading device in an incorrect orientation, the first locking member 82 will continue to engage the pin 38, so preventing movement of the second member 14 relative to the first member 12. Thus, the second member 14 cannot be forced upwardly in such a way as to override the function of the rib/groove arrangement.

The alignment of the pivot centres 86, 92 with the respective lines of movement defined by the elongate slots 30, 32 provides a useful advantage in making the device less sensitive to the tolerances that must be present in the manufacture of assemblies with moving parts. With an expandable cartridge loading device as described, tolerance stack up is an important factor to be taken into account. If the pivot centres of the locking system are in line with the respective lines of movement of the guide tracks, the tolerances are at a minimum.

In the embodiment, the guide tracks are defined by straight-line slots so that movement of the second member is along a straight line. Alternatively, the guide tracks could be defined by recesses in which the projections would be received. In that case, the projections would preferably be considerably shorter than the illustrated projections. As yet another alternative, the recesses, or slots, may be arcuate instead of straightline. In that case, the pivot points should be on a line that is tangential to a portion of the recesses or slots that controls the initial movement of the second member when it moves from its first position, shown in FIG. 3.

As an alternative to slots or recesses defining a guide track, a parallel linkage may be used with the line of movement defined by the parallel arms of a parallel linkage. In this case, the projection engaged by the rotatable locking member will have an arcuate line of movement. One, or a lower, end of the arcuate line will define the position of the second member 14 as shown in FIG. 6 and the other, or upper, end of the arcuate line will define the position of the second member as shown in FIG. 8. The rotatable locking member should have its pivot point located on a line that is tangential to a first portion of the line of movement of the projection, which first portion extends from the lower end of the arcuate line of movement. It will be appreciated that more than one projection may be provided on the parallel linkage, with a respective rotatable locking member for each projection. In that case, the respective pivot axis of the locking members should be located on lines that are tangential to the first portion of the respective arcuate movement lines.

Figure 9:
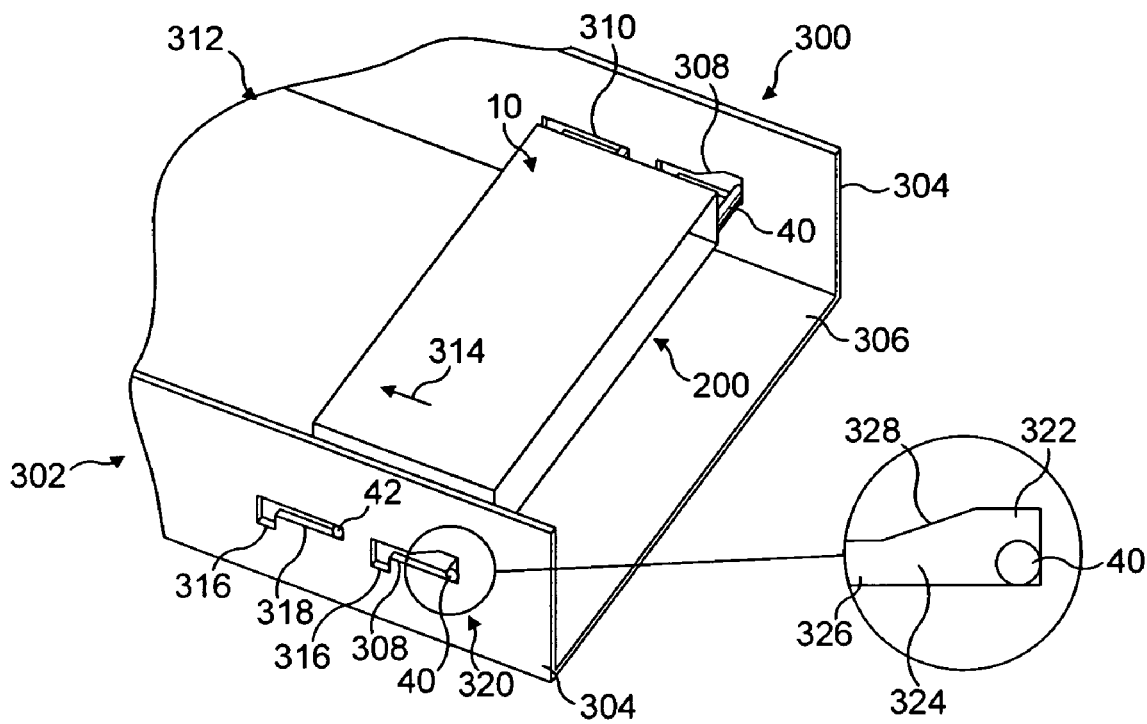
FIG. 9 is a schematic perspective view of a cartridge loading apparatus comprising the cartridge loading device in a mounting and including an enlarged view of a portion of the mounting.
Figure 10:
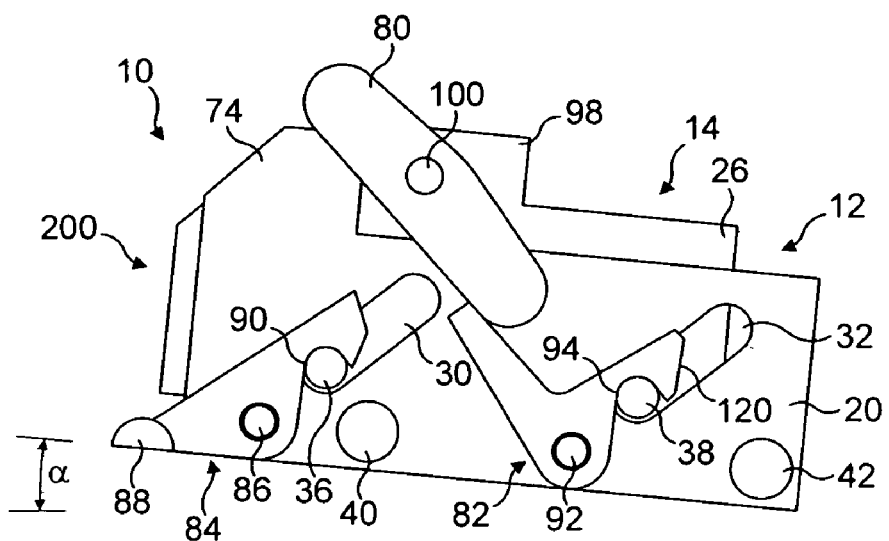
FIG. 10 is a view corresponding to FIG. 7 showing the cartridge loading device in FIG. 9 in a pivotted position allowed by the mounting.

Referring to FIGS. 9 and 10, the cartridge loading apparatus 300 comprises the cartridge loading device 10 mounted in a mounting 302 that supports the device 10. In FIG. 9, the cartridge loading device is illustrated simply as a rectangular box. This is for the sake of clarity and for the same reason, the mounting 302 is omitted from FIG. 10.

The mounting 302 is in the form of a U-shaped channel member comprising two upstanding sides 304 that are disposed in parallel spaced apart relation and interconnected by a transverse member 306. The mounting 302 can conveniently be manufactured by folding a metal sheet. Each side 304 has two guide tracks 308, 310 formed in it. The guide tracks are in the form of elongate slots 308, 310 punched into the sides 304. The pins 40 are received in the front pair of slots 308 and the pins 42 are received in the rear pair of slots 310. The cartridge loading device 10 is supported in the mounting 302 by means of the engagement of the pins 40, 42 in the slots 308, 310.

Each slot 308, 310 comprises a front section along which the pins 40, 42 can slide to allow the cartridge loading device to move towards the rear 312 of the mounting, as indicated by arrow 314. The rear end section of each slot 308, 310 comprises a notch, or recess, 316 into which the pins 40, 42 can drop. This defines the rearmost extent of the travel of the cartridge loading device 10. The engagement of the pins 40, 42 in their respective notches 316 locks the cartridge loading device in position so that it cannot move while a tape is having data written to it or read from it.

The front section 318 of each of the rear pair of slots 310 comprises a straight passage that is of sufficient size to receive the pins 42 with a small clearance. For practical purposes, the front sections 318 allow only linear movement of the pins 42.

The front section 320 of each of the front pair of slots 308 has an enlarged front end 322 that is followed by a tapering section 324 and then a straight passage 326 that is of sufficient size to just receive the pins 40. For practical purposes, the straight passage 326 allows only straightline movement of the pins. The tapering section 324 includes a camming surface 328 that slopes down from the top of the enlarged front end 322 to the top of the straight passage 326.

Although not shown, the mounting 302 would usually be housed in a housing, or compartment, having an inlet aperture through which cartridges can be inserted into the cartridge loading device 10, such as the inlet aperture shown in FIG. 8 that is closed by the doors 112,114. The inlet aperture is sized to permit the insertion of the larger of the two sizes of cartridge the cartridge loading device can received. If a smaller size of cartridge is inserted into the inlet aperture, because it is significantly smaller, at least in height, than the inlet aperture, as indicated by arrow 200, it can be inserted into the front end of the cartridge loading device with its front end pointing downwardly with respect to the horizontal plane of the cartridge loading device. If this occurs, the forces exerted on the cartridge loading device cause it to pivot clockwise (as viewed in FIG. 10) about the rear projecting pins 42 so that it is inclined at an angle α to the horizontal. This pivotting movement is possible because the front pins 40 can rise up as well as moving to the rear 312 in the enlarged front end 322 of their respective front slots 308 whereas the rear pins 42 are constrained to just move to the rear. As the cartridge loading device moves towards the rear 312 of the mounting, its front end has a downward force exerted on it by the engagement of the pins 40 with the respective camming surfaces 328. By the time the pins 40 reach the passages 326, the angle α has reduced to zero and both the cartridge loading device and the cartridge partially inserted therein are positioned in horizontal planes. Continued insertion of the cartridge moves the pins 40, 42 back into the respective notches 316 and movement of the cartridge relative to the cartridge loading device results in movement of the grooves 5 along the ribs 57 until the detents 8 engage in the front end apertures 6.

The controlled pivotting movement of the cartridge loading device 10 relative to the mounting 302 allows the cartridge loading device to move out of a horizontal plane and adopt the angle of inclination of a downwardly inserted cartridge. As the cartridge loading device moves back in the slots 308, 310, both it and the cartridge are brought into a horizontal position before the cartridge loading device and cartridge reach a fully inserted position defined by the notches 316. This ensures that the cartridge is correctly oriented at the time the grooves 5 reach the location of the ribs 57 so that the slider 3 should always be slid to the rear of the body 2 as the cartridge is inserted into the cartridge loading device.

It will be understood that although the mounting 320 has been described as a folded metal sheet, it could be fabricated by joining a number of parts. Furthermore, the slots 308, 310 do not have to be formed by punching and may be formed in any suitable conventional manner. Furthermore, the slots do not have to be formed directly in the sides 304 of the mounting. They could, instead, be defined by parts fitted to the sides 304.

It will be appreciated that the slots 308, 310 may be provided on the cartridge loading device, with the pins 40, 42 provided on the sides of the mounting.

As an alternative to the slots 308, 310, the pins 40, 42 may engage in grooves, or recesses defined in either the mounting or the housing.

It will be understood that the mounting may be a part of a housing for the cartridge loading device.

It will be understood that the eject mechanism of the cartridge loading apparatus would be provided with means for lifting the cartridge device up, to raise the pins 40, 42 out of notches 316.

The invention claimed is:

1. Cartridge loading apparatus comprising a cartridge loading device for magnetic tape cartridges and a mounting for said device, said cartridge loading device comprising a first member, a second member and a guide arrangement for guiding movement of said second member relative to said first member from a first position to a second position, said first and second members cooperating when in said first position to define a first sized opening having a height sized to receive first sized magnetic tape cartridges having a predetermined height and, when in said second position, to define a second sized opening having a height that is greater than the height of said first sized opening, said second sized opening being sized to receive second sized magnetic tape cartridges having a predetermined height that is greater than the height of said first sized magnetic tape cartridges, said cartridge loading device having a front end at which cartridges are inserted into said opening, a rear end and opposite sides extending between said front and rear ends, and said mounting supporting said cartridge loading device at each said side such that said cartridge loading device can slide rearwardly in said mounting from a forward position to a rearward position and said front end of the cartridge loading device can pivot about an axis disposed towards said rear end and extending between said sides during a first portion of said rearward movement.

2. Apparatus as claimed in claim 1, wherein said cartridge loading device is supported in said mounting by projections engaged in guide tracks, which guide tracks have a front end and a rear end and permit said pivoting movement.

3. Apparatus as claimed in claim 2, wherein the guide tracks are provided on the mounting and the projections are carried by the cartridge loading device.

4. Apparatus as claimed in claim 2, wherein each said guide track includes a recess for receiving the respective projection, said recess being disposed at or adjacent the rear end of the guide track.

5. Apparatus as claimed in claim 2, wherein said guide tracks include an enlarged portion at said front end that permits said pivoting movement of the cartridge loading device in a first direction and a camming surface disposed rearwardly of said enlarged portion for causing pivoting movement of said cartridge loading device in a direction opposite said first direction when, in use, the cartridge loading device slides rearwardly in said mounting.

6. Apparatus as claimed in claim 5, wherein each guide track comprises a straightline portion disposed rearwardly of said camming surface and arranged to restrict the rearward movement of said cartridge loading device to substantially straightline movement.

7. Apparatus as claimed in claim 6, wherein said straightline movement is horizontal.

8. Apparatus as claimed in claim 7, wherein said first direction is upward with respect to the horizontal.

9. Apparatus as claimed in claim 2, wherein there are two said projections at each said side, one said projection at each side being disposed closer to said front end of the cartridge loading device and being engaged in said guide tracks and one projection on each side being disposed closer to said rear end of the cartridge loading device and engaged in respective further guide tracks that each have a front end and a rear end.

10. Apparatus as claimed in claim 9, wherein said further guide tracks, at least at the front ends thereof, allow only substantially straightline rearward movement of the projections engaged therein.

11. Cartridge loading apparatus comprising a cartridge loading device for magnetic tapes and support means for said cartridge loading device, said cartridge loading device comprising housing means defining a housing for magnetic tape cartridges and first guide means and said support means comprising second guide means engageable with said first guide means, said housing having a front end into which cartridges are inserted, a rear end and sides extending between said front and rear ends and being expandable from a first size to a second size, said first size having a first height and said second size having a second height, said second height being greater than said first height, said sizes being selected such that said housing can receive magnetic tape cartridges of different predetermined sizes for loading into a digital data transfer apparatus, said support means having a front end and a rear end and said first and second guide means cooperating to permit rearward movement of said cartridge loading device from a forward position to a rearward position and to permit said front end of the cartridge loading device to pivot in a first direction about an axis extending between its sides during a first portion of said rearward movement.

12. Apparatus as claimed in claim 11, wherein said first and second guide means comprise camming means for causing pivoting movement about said axis in a second direction opposite to said first direction during a second portion of said rearward movement.

13. Apparatus as claimed in claim 12, wherein said first and second guide means permit translational movement during a third portion of said rearward movement, which third portion follows said second portion.

14. Apparatus as claimed in claim 11, wherein said second guide means comprises guide tracks and said first guide means comprises respective projections engaged in said guide tracks.

15. Apparatus as claimed in claim 14, wherein said guide tracks each include a recess for receiving the respective projection and holding said cartridge loading device in said rearward position.

16. Cartridge loading apparatus comprising a cartridge loading device for magnetic tape cartridges and support means for said cartridge loading device, said cartridge loading device defining a housing for magnetic tape cartridges, said housing having a front end into which cartridges are inserted and a first guide means and said support comprising a second guide means cooperable with said first guide means, said first and second guide means cooperating to permit pivoting movement of said housing about an axis extending parallel to said front end.

17. A digital data transfer apparatus comprising a cartridge loading apparatus for magnetic tape cartridges as claimed in claim 1.

* * * * *